US012734555B2

(12) United States Patent
Fukushima

(10) Patent No.: US 12,734,555 B2
(45) Date of Patent: Sep. 15, 2026

(54) CLEANING DEVICE FOR WAFER-SUCTION CHUCK MECHANISM

(71) Applicant: TOKYO SEIMITSU CO., LTD., Hachioji (JP)

(72) Inventor: Junichi Fukushima, Hachioji (JP)

(73) Assignee: Tokyo Seimitsu Co., Ltd., Tokyo (JP)

( * ) Notice: Subject to any disclaimer, the term of this patent is extended or adjusted under 35 U.S.C. 154(b) by 390 days.

(21) Appl. No.: 18/283,167

(22) PCT Filed: Dec. 14, 2021

(86) PCT No.: PCT/JP2021/045924
§ 371 (c)(1),
(2) Date: Jun. 4, 2024

(87) PCT Pub. No.: WO2022/201665
PCT Pub. Date: Sep. 29, 2022

(65) Prior Publication Data

US 2025/0065377 A1 Feb. 27, 2025

(30) Foreign Application Priority Data

Mar. 26, 2021 (JP) ................................ 2021-054214

(51) Int. Cl.
*B08B 1/12* (2024.01)
*B08B 1/16* (2024.01)
*B08B 3/02* (2006.01)

(52) U.S. Cl.
CPC ................ *B08B 1/12* (2024.01); *B08B 1/165* (2024.01); *B08B 3/02* (2013.01)

(58) Field of Classification Search
CPC .. B08B 1/12; B08B 1/165; B08B 3/02; B08B 3/04; H01L 21/304; H10P 52/00
See application file for complete search history.

(56) References Cited

U.S. PATENT DOCUMENTS

2005/0039779 A1* 2/2005 Ohtsuka .................... B08B 3/02 134/30
2005/0118938 A1* 6/2005 Mizomoto ............ B24B 37/345 451/65

(Continued)

FOREIGN PATENT DOCUMENTS

JP H1145866 2/1999
JP 2005051094 2/2005

(Continued)

OTHER PUBLICATIONS

International Preliminary Report on Patentability, PCT/JP2021/045924, dated Oct. 14, 2022, 3 pages.

(Continued)

*Primary Examiner* — Alexander Markoff
(74) *Attorney, Agent, or Firm* — Fattibene and Fattibene, LLC; Paul A. Fattibene

(57) ABSTRACT

A cleaning device for a wafer-suction chuck mechanism capable of automatically and simply performing cleaning treatment on a chuck surface that suction-holds a wafer and cleaning treatment on a frame suction-holding section. The cleaning device is configured to include a scraper 17 and a brush 18 that press frame suction-holding section cleaning means 10B for removing a sludge on a frame suction-holding section 11B onto the frame suction-holding section 11B, and a water nozzle 19 that discharges and supplies water onto the frame suction-holding section 11B.

5 Claims, 7 Drawing Sheets

(56) References Cited

U.S. PATENT DOCUMENTS

| | | | | |
|---|---|---|---|---|
| 2009/0025763 | A1* | 1/2009 | Nonomura | H01L 21/67051 134/198 |
| 2016/0243593 | A1* | 8/2016 | Tanaka | B08B 1/54 |

FOREIGN PATENT DOCUMENTS

| | | | |
|---|---|---|---|
| JP | 2010021464 | | 1/2010 |
| JP | 2010137349 | * | 6/2010 |
| JP | 2011125988 | * | 6/2011 |
| JP | 2017073457 | * | 4/2017 |
| JP | 2018187598 | * | 11/2018 |
| JP | 2020136618 | A | 8/2020 |
| KR | 20110081024 | * | 7/2011 |
| TW | I706458 | * | 10/2020 |

OTHER PUBLICATIONS

International Search Report, PCT/JP2021/045924, dated Mar. 8, 2022, 2 pages.

* cited by examiner

CLEANING DEVICE FOR WAFER-SUCTION CHUCK MECHANISM

TECHNICAL FIELD

The present invention relates to a cleaning device for a wafer-suction chuck mechanism, and particularly to a cleaning device for a wafer-suction chuck mechanism that suction-holds a wafer integrated with a ring frame by an adhesive film.

BACKGROUND ART

In a semiconductor manufacturing field, a wafer tends to increase in size year by year. To increase a mounting density, the wafer has been made thinner. To thin the wafer, so-called backgrinding for grinding a back surface of a semiconductor wafer (hereinafter referred to as a "wafer") and thinning the wafer is performed (see, e.g., Patent Literature 1).

Nowadays, as a grinding device that thins a wafer, there is a configuration in which a wafer integrated with a ring frame by an adhesive film is suction-held to be releasable by a chuck table and the ring frame is suction-held to be releasable by an annular frame suction-holding section arranged to surround a suction chuck section. In the grinding device, a cutting sludge adheres to a chuck surface of the chuck table that suction-holds the wafer and the frame suction-holding section that suction-holds the ring frame. This type of grinding device requires a mechanism that removes the grinding sludge.

The conventional chuck table is divided into the chuck surface that suction-holds the wafer and the frame suction-holding section that suction-holds the ring frame. In cleaning treatment on the chuck surface that suction-holds the wafer, cleaning is performed by bringing a dress grinding stone that is rotating into contact with the chuck table that is rotating. On the other hand, if a sludge in the frame suction-holding section is not removed, an inconvenience occurs in the suction of the ring frame. In cleaning treatment on the frame suction-holding section, an operator supplies purified water to the frame suction-holding section using a water gun and brings BEMCOT® or the like into contact with the frame suction-holding section to remove the sludge while rotating the frame suction-holding section together with the chuck table.

CITATION LIST

Patent Literature

Patent Literature 1: Japanese Patent Laid-Open No. 2010-137349

SUMMARY OF INVENTION

Technical Problem

In a cleaning device for a wafer-suction chuck mechanism, a dress grinding stone that is rotating is pressed against a chuck table that is rotating to perform cleaning in cleaning treatment on a chuck surface that suction-holds a wafer, and an operator supplies purified water to the frame suction-holding section using a water gun and brings BEMCOT® or the like into contact with the frame suction-holding section to remove a sludge while rotating the frame suction-holding section and the chuck table after wafer grinding in cleaning treatment on the frame suction-holding section. Accordingly, the cleaning treatment on the frame suction-holding section has had a problem of poor workability because it is manually performed by the operator.

Therefore, there occurs a technical problem to be solved to provide a cleaning device for a wafer-suction chuck mechanism, the cleaning device being capable of automatically and simply performing cleaning treatment on a chuck surface that suction-holds a wafer and cleaning treatment on a frame suction-holding section, and the present invention has its object to solve this problem.

Solution to Problem

The present invention has been proposed to attain the above-described object, and the invention set forth provides a cleaning device for a wafer-suction chuck mechanism, which rotates, including a wafer-suction chuck section that suction-holds a wafer attached to a ring frame with an adhesive film interposed therebetween and an annular frame suction-holding section that suction-holds the ring frame outside the wafer-suction chuck section, the cleaning device including frame suction-holding section cleaning means being movable onto the frame suction-holding section and for cleaning the frame suction-holding section, in which the frame suction-holding section cleaning means includes a scraper and a brush capable of contacting the frame suction-holding section and a water nozzle that discharges water onto the frame suction-holding section, the water nozzle, the brush, and the scraper are arranged in the order from an upstream side towards a downstream side in a rotation direction of the frame suction-holding section.

According to this configuration, when the sludge in the frame suction-holding section is removed, the frame suction-holding section cleaning means is arranged on the frame suction-holding section with the wafer chuck mechanism rotated. When either one of the brush and the scraper is brought into contact with the frame suction-holding section while discharging water thereonto from the water nozzle, the sludge floats with the water, and the sludge is scraped by either one of the brush and the scraper. The sludge that has been scraped by either one or both of the brush and the scraper is caused to flow and discharged out of the frame suction-holding section with the water discharged from the water nozzle, whereby the sludge on the frame suction-holding section can be removed. Therefore, this work is interlocked with cleaning work by the suction chuck cleaning grinding stone section for removing the sludge on the frame suction-holding section cleaning means, thereby making it possible to simultaneously remove the sludge on the wafer-suction chuck section and remove the sludge on the frame suction-holding section.

The invention set forth in another embodiment, the cleaning device for the wafer-suction chuck mechanism, the cleaning device further including a suction chuck cleaning grinding stone section that is configured to be movable on the wafer-suction chuck section and cleans the wafer-suction chuck section, in which the frame suction-holding section cleaning means is configured to be movable integrally with the suction chuck cleaning grinding stone section.

According to this configuration, when a dress grinding stone in the suction chuck cleaning grinding stone section is brought into contact with the wafer-suction chuck section with the wafer chuck mechanism rotated, and the frame suction-holding section cleaning means is arranged on the frame suction-holding section, the sludge on the wafer-suction chuck section is scraped by the dress grinding stone, and the sludge on the frame suction-holding section is scraped by the frame suction-holding section cleaning means. This makes it possible to simultaneously remove the sludge on the wafer-suction chuck section and remove the sludge on the frame suction-holding section.

The invention set forth in another embodiment, the cleaning device for the wafer-suction chuck mechanism, in which the frame suction-holding section has a water discharge hole that discharges water onto the frame suction-holding section.

According to this configuration, during cleaning on the frame suction-holding section, water is discharged from a plurality of water discharge holes provided in the frame suction-holding section, to wet the entire frame suction-holding section, and water is discharged from the water nozzle, to bring the brush into contact with the frame suction-holding section. Accordingly, the sludge further easily floats, and is scraped by the scraper, resulting in an improved cleaning treatment effect.

The invention set forth in another embodiment, the cleaning device for the wafer-suction chuck mechanism, in which the frame suction-holding section cleaning means includes a spring mechanism that elastically absorbs a force for pressing the scraper or the brush against the frame suction-holding section.

According to this configuration, when the scraper or the brush is excessively pressed against the frame suction-holding section, a force with which the scraper and the brush contact the frame suction-holding section can be made substantially constant upon being buffered with a spring action by the spring mechanism.

The invention set forth in another embodiment, the cleaning device for the wafer-suction chuck mechanism, the cleaning device further including a keep-wet nozzle that intermittently supplies water onto the frame suction-holding section.

According to this configuration, the water is intermittently supplied onto the frame suction-holding section from the keep-wet nozzle during a standing time period of the cleaning device, thereby making it possible to prevent the sludge from adhering to the frame suction-holding section by drying.

Advantageous Effect of Invention

According to the present invention, cleaning on a wafer-suction chuck section and cleaning on a frame suction-holding section can be simultaneously performed. This makes it possible to automate cleaning treatment on a chuck surface that suction-holds a wafer and cleaning treatment on the frame suction-holding section.

In removal of a sludge in the frame suction-holding section, when frame suction-holding section cleaning means is arranged on the frame suction-holding section with a wafer chuck mechanism rotated, and either one of a brush and a scraper is brought into contact with the frame suction-holding section while discharging water thereonto from a water nozzle, the sludge floats with the water, and the sludge is scraped by either one or both of the brush and the scraper. Further, the sludge that has been scraped is caused to flow and discharged out of the frame suction-holding section with the water discharged from the water nozzle. Accordingly, the sludge on the frame suction-holding section can be simply and cleanly removed.

DESCRIPTION OF EMBODIMENT

Figure 1:
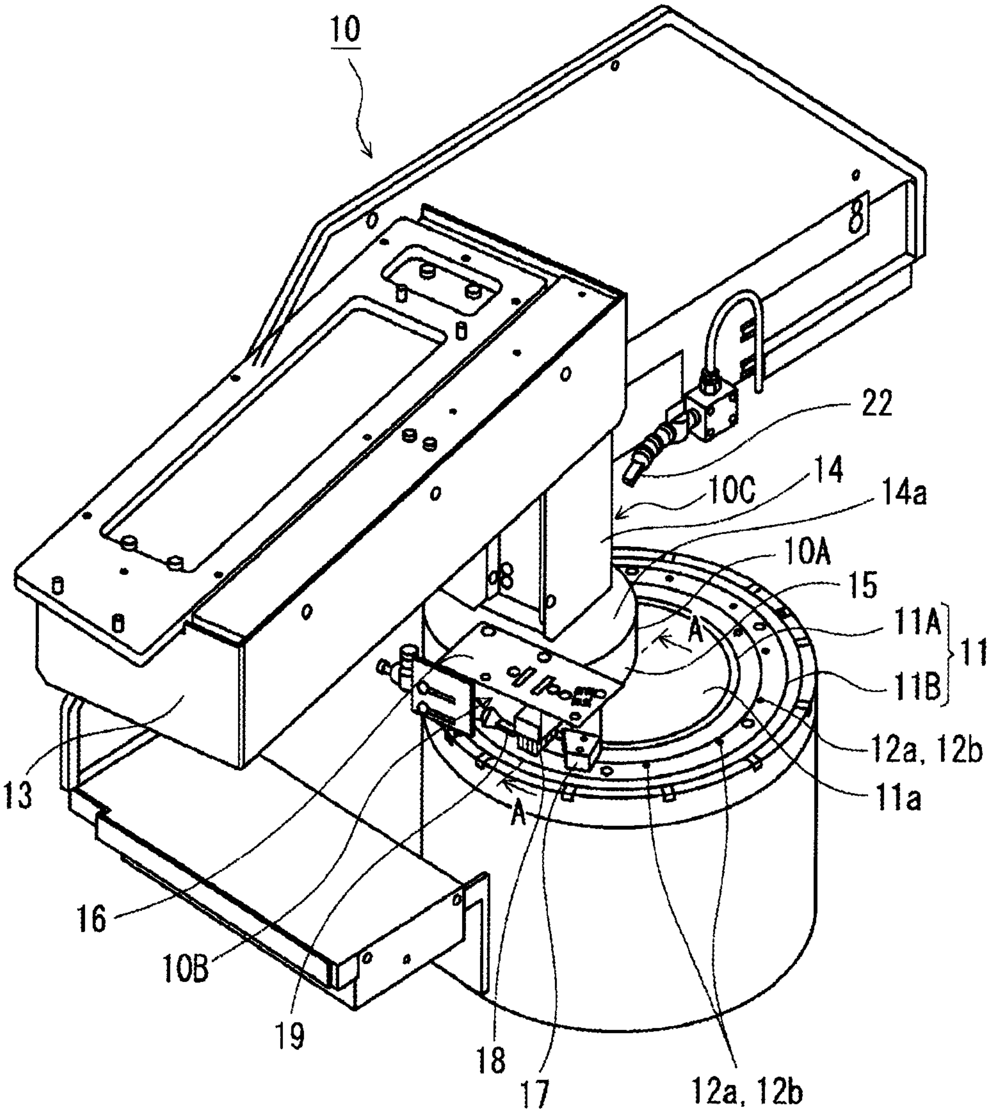
FIG. 1 is a perspective view of a wafer chuck mechanism and a cleaning device illustrated as an example according to an embodiment of the present invention.

The present invention has implemented, to attain an object to provide a cleaning device for a wafer-suction chuck mechanism, the cleaning device being capable of automatically and simply performing cleaning treatment on a chuck surface that suction-holds a wafer and cleaning treatment on a frame suction-holding section, a cleaning device for a wafer-suction chuck mechanism, which rotates, including a wafer-suction chuck section that suction-holds a wafer attached to a ring frame with an adhesive film interposed therebetween and an annular frame suction-holding section that suction-holds the ring frame outside the wafer-suction chuck section, the cleaning device including frame suction-holding section cleaning means being movable onto the frame suction-holding section and for cleaning the frame suction-holding section, in which the frame suction-holding section cleaning means includes at least one of a scraper and a brush capable of contacting the frame suction-holding section and a water nozzle that discharges water onto the frame suction-holding section.

EXAMPLE

An example according to an embodiment of the present invention will be described in detail below with reference to the accompanying drawings. In the following example, when reference is made to the number of components or a numerical value, amount, range, or the like of each of the components, the number or the like is not limited to a particular number but may be the particular number or more or the particular number or less unless otherwise stated or except when expressly limited to the particular number in principle.

When reference to a shape of each of components and a positional relationship among the components, a substantially approximate or similar shape or the like is included unless otherwise stated or except when considered to be expressly excluded in principle.

In the drawings, there is a case where characteristic portions are exaggerated by being enlarged, for example, in order to facilitate the understanding of features, and a dimension ratio or the like of each of the components is not necessarily the same as an actual one. In a cross-sectional view, hatching of some of the components may be omitted in order to facilitate the understanding of a cross-sectional structure of the components.

In the following description, terms representing directions such as up-down and left-right directions are not absolute, but are appropriate if each of sections in a cleaning device for a wafer-suction chuck mechanism according to the present invention is in a depicted orientation. However, if the orientation has changed, the terms should be construed by being changed depending on the change in the orientation. Throughout the entire description of the example, the same elements are respectively denoted by the same reference numerals.

FIGS. 1 to 6 illustrate a cleaning device 10 according to the present invention. The cleaning device 10 removes a sludge that has adhered to a chuck mechanism 11, and includes a suction chuck cleaning grinding stone section 10A, a frame suction-holding section cleaning means 10B, and position movement means 10C. The chuck mechanism 11 includes a wafer-suction chuck section 11A and a frame suction-holding section 11B provided to surround the outside of the wafer-suction chuck section 11A. The wafer-suction chuck section 11A and the frame suction-holding section 11B integrally rotate in a direction indicated by an arrow D in FIG. 2. A wafer W is attached during grinding processing to the chuck mechanism 11.

Figure 7:
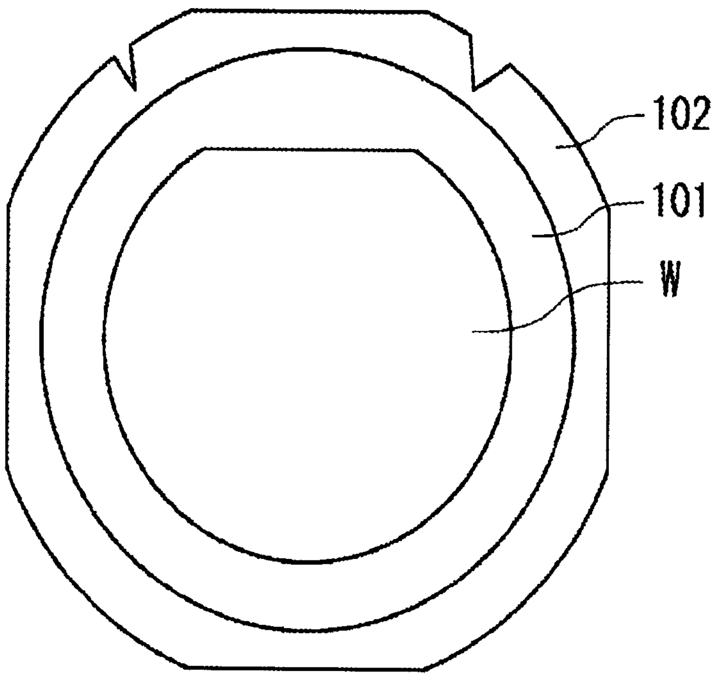
FIG. 7 is a plan view illustrating an example of a wafer held in a ring frame with an adhesive frame interposed therebetween.

As the wafer W here, a wafer W held in a ring frame 102 with an adhesive film 101 interposed therebetween, illustrated in FIG. 7, for example, is used. During the grinding processing, the wafer W, together with the adhesive film 101, is suction-held on a chuck surface 11*a* of the wafer-suction chuck section 11A, and the ring frame 102 is suction-held in the frame suction-holding section 11B. The wafer-suction chuck section 11A and the frame suction-holding section 11B are independent of each other, and the wafer-suction chuck section 11A and the frame suction-holding section 11B are movable relative to each other in an up-down direction. When the wafer-suction chuck section 11A moves in an upward direction, for example, with the frame suction-holding section 11B suction-holding the ring frame 102, the entire adhesive film 101 is extended so that the wafer W is easily removed from above the adhesive film 101.

The chuck surface 11*a* of the wafer-suction chuck section 11A is formed of a porous material, and the wafer W affixed to and arranged in the adhesive film 101 is suction-holdable by vacuuming on the chuck surface 11*a*. When the chuck surface 11*a* is cleaned, cleaning water (purified water) can be discharged from the entire chuck surface 11*a*.

The frame suction-holding section 11B has a plurality of suction holes 12*a* that vacuum the ring frame 102 placed on the frame suction-holding section 11B and suction-hold the ring frame 102 on the frame suction-holding section 11B and a plurality of wafer discharge holes 12*b* that discharge cleaning water (purified water) from an upper surface of the frame suction-holding section 11B during cleaning on the frame suction-holding section 11B respectively provided therein to be substantially equally spaced apart from each other to form lines in a circumferential direction. The suction hole 12*a* and the water discharge hole 12*b* may be respectively separately provided, although shared as the same hole in the present embodiment. A piping line to be vacuumed by the frame suction-holding section 11B and a piping line to be vacuumed by the chuck surface 11*a* of the wafer-suction chuck section 11A are respectively separate systems. Therefore, the vacuuming can be controlled for each of the systems.

The position movement means 10C in the cleaning device 10 integrally moves the suction chuck cleaning grinding stone section 11A and the frame suction-holding section cleaning means 10B to a cleaning position and a standby position. The position movement means 10C includes a rail member 13 that guides movement of the suction chuck cleaning grinding stone section 10A and the frame suction-holding section cleaning means 10B between the cleaning position and the standby position horizontally along one side of the wafer-suction chuck section 11A, and an arm 14 that holds the suction chuck cleaning grinding stone section 10A. That is, the movement between the cleaning position and the standby position of the suction chuck cleaning grinding stone section 10A and the frame suction-holding section cleaning means 10B is performed by guidance of the arm 14 and the rail member 13. The rail member 13 is attached to a base member 21. A drying prevention nozzle 22 that supplies water to the frame suction-holding section 11B to prevent drying is attached to the base member 21 during a standby time period.

The suction chuck cleaning grinding stone section 10A includes a dress grinding stone 15 attached to a lower end of the arm 14 to be horizontally rotatable. The dress grinding stone 15 rotates in a direction indicated by an arrow E in FIG. 2 with a driving force of a motor not illustrated. While horizontally rotating, the dress grinding stone 15 is pressed against the chuck surface 11*a* of the wafer-suction chuck section 11A that is similarly rotating, i.e., brought into contact therewith by movement in an up-down direction of the arm 14, to scrape a sludge that has adhered on the chuck surface 11*a*. During the contact, water is discharged from a lower surface of the dress grinding stone 15, to make the sludge on the chuck surface 11*a* float and scrape the sludge.

The frame suction-holding section cleaning means 10B is attached to a flange-shaped member 14*a* adjacent to an upper surface of the dress grinding stone 15 and fixedly attached to a lower end portion of the arm 14 in a unitized state. That is, the frame suction-holding section cleaning means 10B includes a unit base 16 detachably attached to the flange-shaped member 14*a*, and is unitized by a scraper 17, a brush 18, and a water nozzle 19 being attached to the lower surface side of the unit base 16 in this order in a shape against a rotational direction of the frame suction-holding section 11B. The frame suction-holding section cleaning means 10B unitized by the unit base 16 is detachably attached to the flange-shaped member 14*a* with a bolt and a nut, for example, while remaining unitized.

Figure 2:
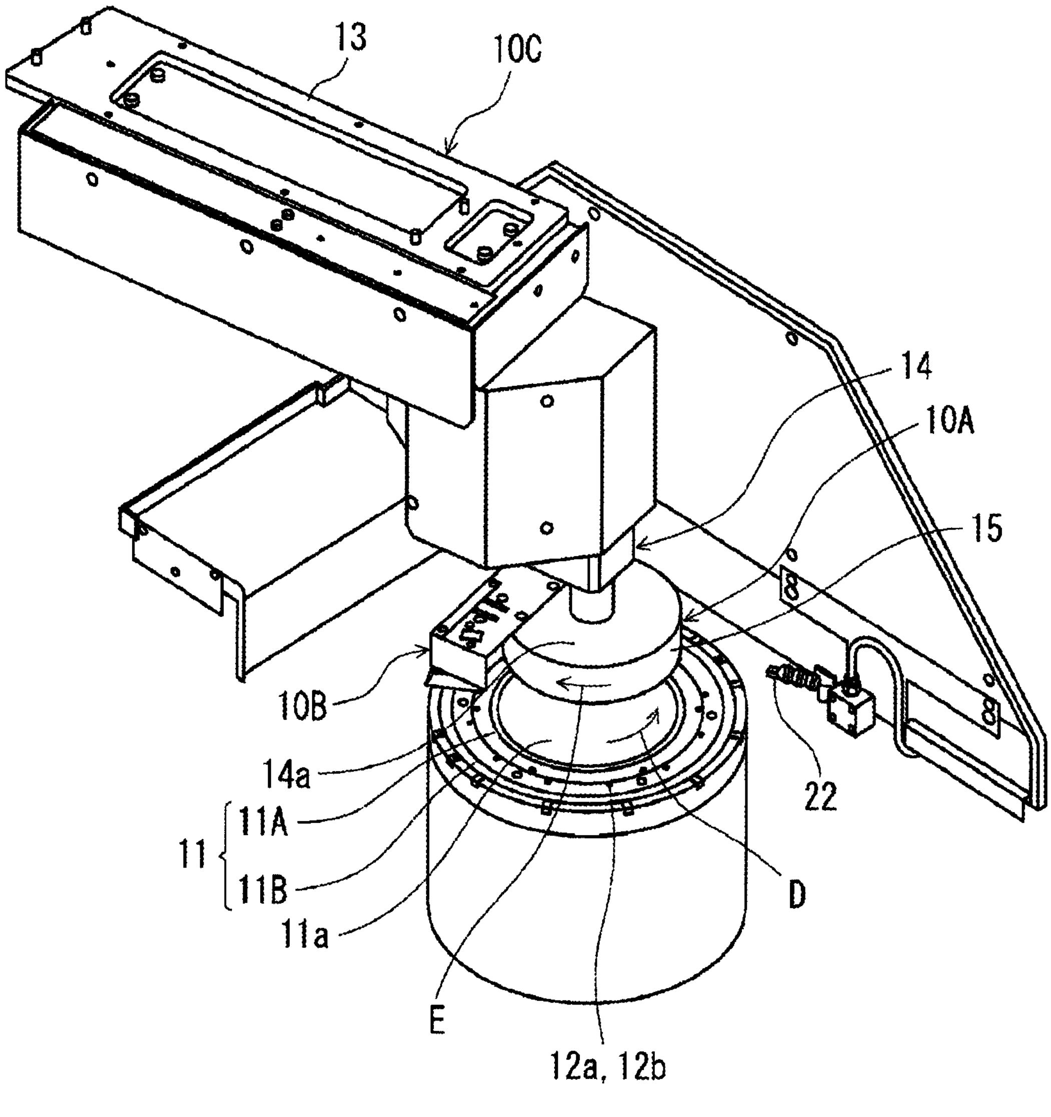
FIG. 2 is a perspective view of the wafer chuck mechanism and the cleaning device illustrated as viewed from the front right side in FIG. 1.
Figure 3A:
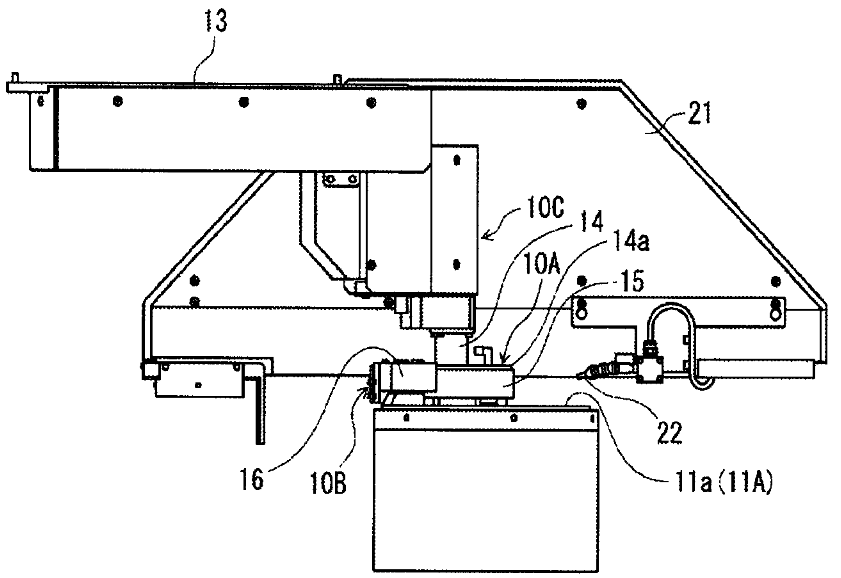
FIGS. 3*a-b* are diagrams illustrating a suction chuck cleaning grinding stone section and frame suction-holding section cleaning means with an arm arranged at a cleaning position and by omitting some of components, where FIG. 3(*a*) is a side view, and FIG. 3(*b*) is a plan view obtained by omitting a partial configuration of FIG. 3(*a*).
Figure 3B:
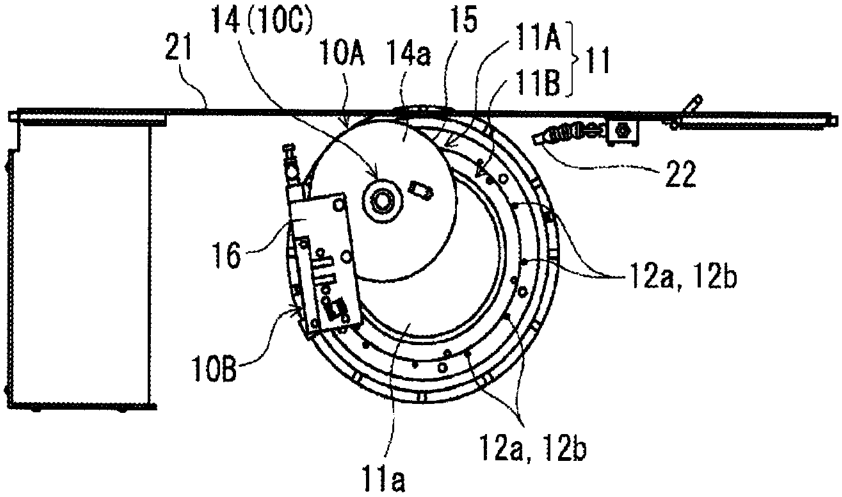
Figure 4A:
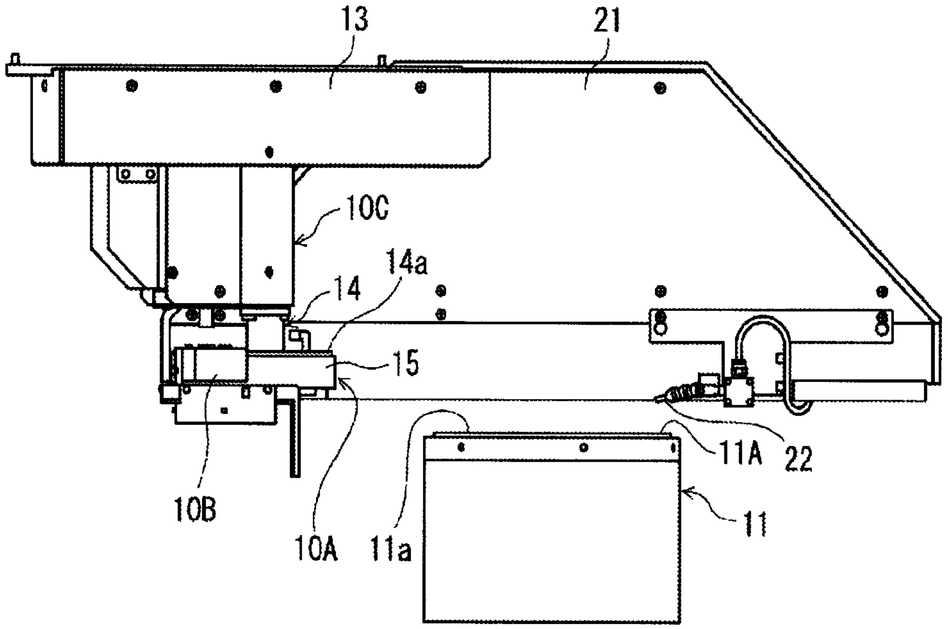
FIGS. 4*a-b* are diagrams illustrating the suction chuck cleaning grinding stone section and the frame suction-holding section cleaning means with the arm arranged at a standby position and by omitting some of the components, where FIG. 4(*a*) is a side view, and FIG. 4(*b*) is a plan view obtained by omitting a partial configuration of FIG. 4(*a*).
Figure 4B:
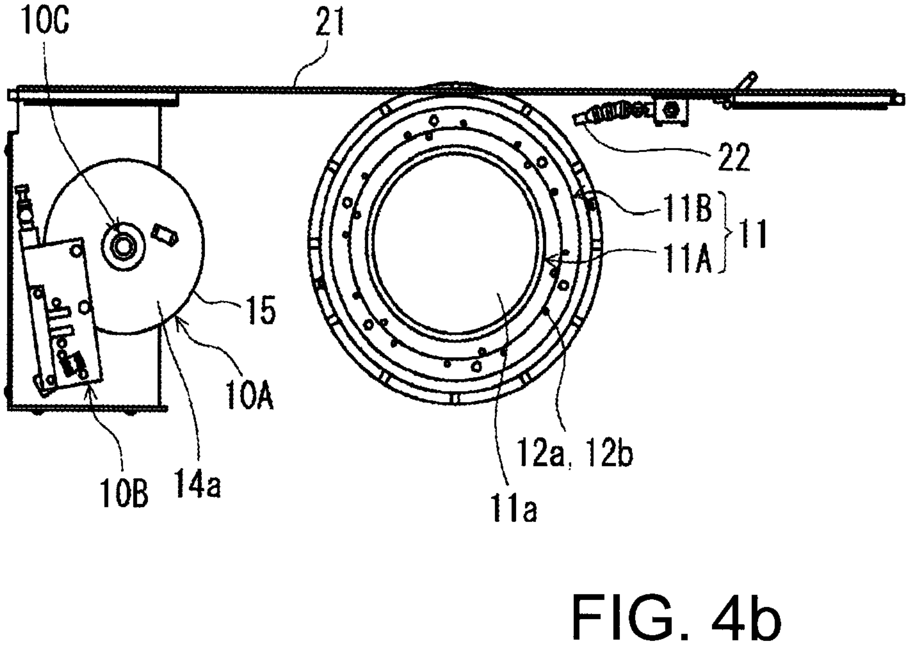
Figure 5:
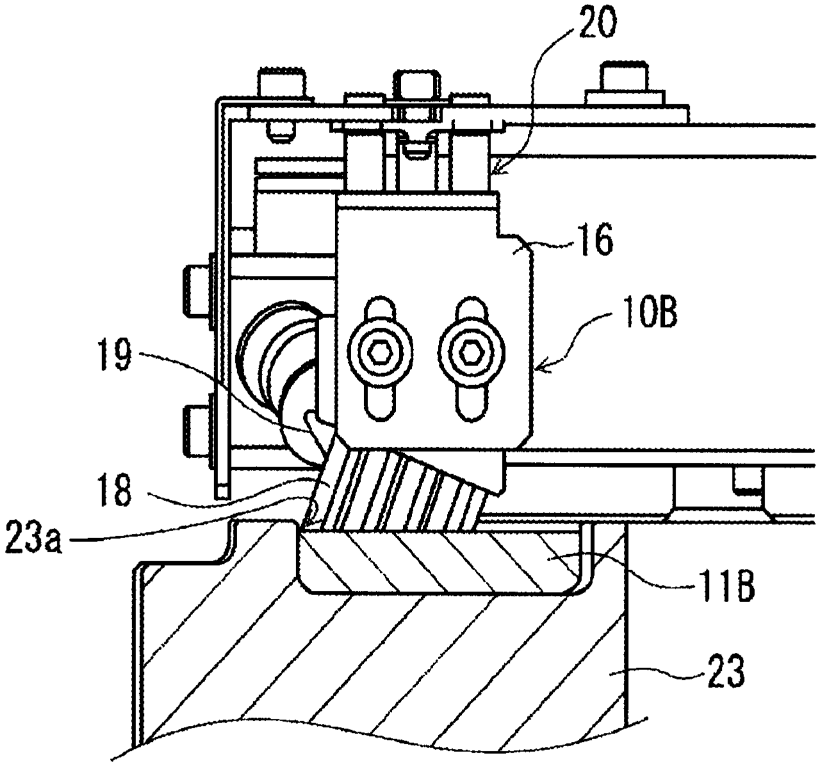
FIG. 5 is an enlarged view illustrating a main configuration of the frame suction-holding section cleaning means in the cleaning device as viewed in a direction A-A in FIG. 1.
Figure 6:
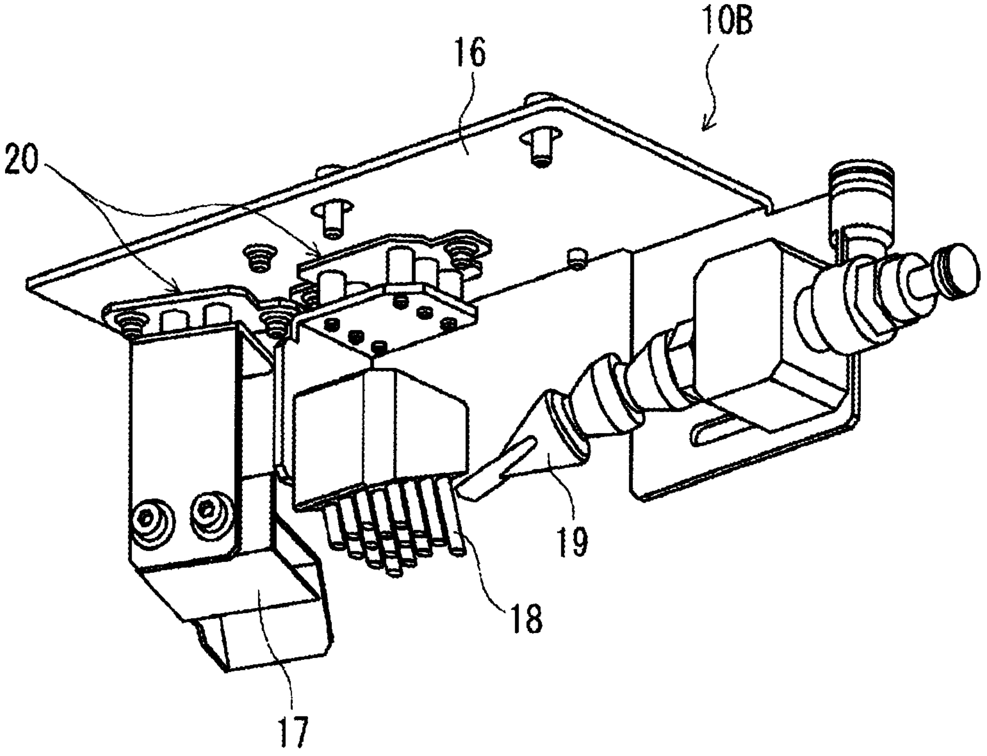
FIG. 6 is a perspective view illustrating a main configuration of the frame suction-holding section cleaning means in the cleaning device.

The frame suction-holding section cleaning means 10B is configured such that the water nozzle 19, the brush 18, and the scraper 17 are arranged on the frame suction-holding section 11B in the order from an upstream side toward a downstream side in the rotational direction of the frame suction-holding section 11B when moved to the cleaning position by the position movement means 10C, as illustrated in FIGS. 1, 2, and 3. As illustrated in FIG. 5, there is provided between the unit base 16 and the brush 18 and the scraper 17 a spring mechanism 20 for buffering a contact force (pressing force) for the brush 18 and the scraper 17 to contact the frame suction-holding section 11B to be substantially constant. The brush 18 is diagonally attached to the frame suction-holding section 11B such that the sludge that has adhered to a location 23*a* at a corner of a base 23 of the frame suction-holding section 11B can be removed.

An operation of the cleaning device 10 is controlled by control means not illustrated. The control means controls each of components constituting the cleaning device 10. The control means is a computer, for example, and includes a CPU, a memory, and the like. A function of the control means may be implemented by control using software or may be implemented by operating using hardware.

Then, an example of the operation of the cleaning device 10 will be described. When the grinding device is performing grinding processing for the wafer W, the suction chuck cleaning grinding stone section 10A and the frame suction-holding section cleaning means 10B are moved to the standby position illustrated in FIG. 4 by the position movement means 10C.

When the grinding processing by the grinding device is finished, to perform sludge cleaning on the chuck surface 11*a* of the wafer-suction chuck section 11A and sludge cleaning on the frame suction-holding section 11B, the position movement means 10C moves the arm 14 to the cleaning position with the wafer-suction chuck section 11A and the frame suction-holding section 11B rotating. As a result, the suction chuck cleaning grinding stone section 10A and the frame suction-holding section cleaning means 10B, together with the arm 14, integrally move to above the cleaning position.

Before sludge cleaning treatment is actually started, i.e., during a standby time period, the wafer-suction chuck section 11A and the frame suction-holding section 11B are respectively rotated at predetermined speeds. Further, to prevent the sludge that has adhered to each of the chuck surface 11*a* of the wafer-suction chuck section 11A and the frame suction-holding section 11B from being dried, the drying is prevented by spraying water from the chuck surface 11*a* in the wafer-suction chuck section 11A and prevented by receiving water from the water discharge hole 12*b* and water from the drying prevention nozzle 22 in the frame suction-holding section 11B.

Then, the dress grinding stone 15 in the suction chuck cleaning grinding stone section 10A is rotated, and the arm 14 is lowered. FIGS. 1, 2, and 3 illustrate a state where the arm 14 is arranged in this cleaning position and is also lowered.

In the suction chuck cleaning grinding stone section 10A, the dress grinding stone 15 that is rotating is pressed against (brought into contact with) the chuck surface 11*a* of the wafer-suction chuck section 11A, to perform cleaning treatment for the sludge that has adhered on the chuck surface 11*a*. In the sludge cleaning treatment, cleaning water is discharged and supplied from a grinding surface of the dress grinding stone 15 and an entire surface of the chuck surface 11*a* so that the sludge is cleaned, and the cleaning water after the cleaning is discharged toward the outside of the chuck surface 11*a*.

On the other hand, in the frame suction-holding section cleaning means 10B, cleaning water is discharged and supplied onto the frame suction-holding section 11B from the water nozzle 19, and the scraper 17 and the brush 18 contact the frame suction-holding section 11B that is rotating, to perform cleaning treatment for the sludge that has adhered to the frame suction-holding section 11B. In the cleaning treatment for the sludge in the frame suction-holding section 11B, water is discharged from the plurality of water discharge holes 12*b* provided in the frame suction-holding section 11B, and water is further discharged from the water nozzle 19 to bring the brush 18 into contact with the frame suction-holding section 11B with the entire frame suction-holding section 11B wetted. Accordingly, the sludge easily floats, and is scraped by the scraper 17, whereby the scraping is smoothly performed. This makes it possible to simultaneously perform cleaning treatment on the chuck surface 11*a* of the wafer-suction chuck section 11A and cleaning treatment on the frame suction-holding section 11B.

If the cleaning treatment on the chuck surface 11*a* of the wafer-suction chuck section 11A and the cleaning treatment on the frame suction-holding section 11B are finished, the discharge and supply of the cleaning water from the water nozzle 19 and the supply of the cleaning water from the dress grinding stone 15 and the cleaning water from the chuck surface 11*a* are stopped. The rotation of the dress grinding stone 15 is also stopped, and the arm 14 rises so that the dress grinding stone 15 also separates from the chuck surface 11*a*. Then, the suction chuck cleaning grinding stone section 10A and the frame suction-holding section cleaning means 10B are moved to the standby position illustrated in FIG. 4 by the position movement means 10C. As a result, one cycle of the cleaning treatment on the chuck surface 11*a* of the wafer-suction chuck section 11A and the cleaning treatment on the frame suction-holding section 11B is finished, to wait until an instruction to perform cleaning treatment on the chuck surface 11*a* of the wafer-suction chuck section 11A and cleaning treatment on the frame suction-holding section 11B again is issued.

Therefore, in the cleaning device 10 according to the present embodiment, cleaning on the wafer-suction chuck section 11A and cleaning on the frame suction-holding section 11B can be simultaneously performed, thereby making it possible to automatically perform the cleaning treatment on the chuck surface 11*a* that suction-holds the wafer W and the cleaning treatment on the frame suction-holding section 11B.

In the frame suction-holding section 11B, the plurality of water discharge holes 12*b* that discharge water are provided in the circumferential direction of the frame suction-holding section 11B. Accordingly, during the cleaning on the frame suction-holding section 11B, water is discharged from the water discharge holes 12*b* provided in the frame suction-holding section 11B, and water is further discharged from the water nozzle 19 and the brush 18 is brought into contact with the frame suction-holding section 11B with the entire frame suction-holding section wetted. Accordingly, the sludge further easily floats, and is scraped by the scraper 17, resulting in an improved cleaning treatment effect.

The wafer-suction chuck section 11A is provided with a water discharge hole that discharges water from the entire chuck surface 11*a* during the cleaning on the wafer-suction chuck section 11A. Accordingly, during the cleaning on the wafer-suction chuck section 11A, water is discharged from the entire chuck surface 11*a* of the wafer-suction chuck section 11A, whereby the dress grinding stone 15 can be brought into contact with the wafer-suction chuck section 11A with the entire wafer suction chuck section wetted, thereby preventing heat from being generated when the dress grinding stone 15 contacts the wafer suction chuck section 11A and making it possible to easily discharge the sludge scraped by the dress grinding stone 15 out of the wafer suction chuck section 11A.

The frame suction-holding section cleaning means 10B is provided with the spring mechanism 20 for buffering for the scraper 17 and the brush 18 against the frame suction-holding section 11B. Accordingly, the scraper 17 and the brush 18 can be brought into contact with the frame suction-holding section 11B with a constant force by buffering a force (pressing force) with which the scraper 17 and the brush 18 contact the frame suction-holding section 11B with a spring action by the spring mechanism 20 to be substantially constant. A structure in which only one spring mechanism 20 is provided to be common between the scraper 17 and the brush 18 or a structure in which a spring mechanism 20 and a spring mechanism 20 are respectively provided for the scraper 17 and the brush 18 may be used. Finer buffering adjustment can be made when the spring mechanisms 20 are individually provided.

The drying prevention nozzle (keep-wet nozzle) 22 that intermittently supplies water onto the frame suction-holding section 11B during a standby time period of the cleaning device 10 is provided, to intermittently supply water onto the frame suction-holding section 11B from the drying prevention nozzle 22 during the standby time period of the cleaning device 10, thereby making it possible to prevent the sludge from adhering to the frame suction-holding section 11B by drying.

In the above-described embodiment, although there is disclosed a configuration in which the sludge in the frame-suction holding section 11B is removed in a procedure for bringing the brush 18 into contact with the frame suction-holding section 11B while discharging water thereonto from the water nozzle 19 with the wafer-suction chuck section 11A rotated when removing the sludge and further bringing the scraper 17 into contact with the frame suction-holding section 11B to scrape the sludge, the sludge may be removed by bringing either one of the brush 18 and the scraper 17 into contact with the frame suction-holding section 11B.

It should be understood that various modifications can be made without departing from the spirit of the prevent invention and the present invention covers the modifications.

REFERENCE SIGNS LIST

10: cleaning device
10A: suction chuck cleaning grinding stone section
10B: frame suction-holding section cleaning means
10C: position movement means
11: chuck mechanism
11A: wafer-suction chuck section
11B: frame suction-holding section
11*a*: chuck surface
12*a*: suction hole
12*b*: water discharge hole
13: rail member
14: arm
14*a*: flanged-shaped member
15: dress grinding stone
16: unit base
17: scraper
18: brush
19: water nozzle
20: spring mechanism
21: base member
22: drying prevention nozzle
23: base
23*a*: location
101: adhesive film
102: ring frame
W: wafer

What is claimed is:

1. A cleaning device for a wafer-suction chuck mechanism, that the wafer-suction chuck mechanism comprising a wafer-suction chuck section which suction-holds a wafer attached to a ring frame with an adhesive film interposed therebetween and a frame suction-holding section which is formed annular and suction-holds the ring frame outside the wafer-suction chuck section, the wafer-suction chuck section and the frame suction-holding section rotate along a rotation direction, the cleaning device comprising:

frame suction-holding section cleaning means that comprises a scraper and a brush capable of contacting the frame suction-holding section and a water nozzle that discharges water onto the frame suction-holding section, position movement means that moves the frame suction-holding section cleaning means to the frame suction-holding section, and bring the scraper and the brush into contact with the frame suction-holding section that is rotating, wherein the water nozzle, the brush, and the scraper are arranged in the order from an upstream side towards a downstream side in the rotation direction of the frame suction-holding section.

2. The cleaning device for the wafer-suction chuck mechanism according to claim 1, further comprising:

a suction chuck cleaning grinding stone section that is capable of contacting the wafer-suction chuck section, wherein the position movement means integrally moves the frame suction-holding section cleaning means and the suction chuck cleaning grinding stone section, the position movement means moves the suction chuck cleaning grinding stone section to the wafer-suction chuck section, and brings the suction chuck cleaning grinding stone section into contact with the wafer-suction chuck section that is rotating.

3. The cleaning device for the wafer-suction chuck mechanism according to claim 1, wherein the frame suction-holding section has a water discharge hole that discharges water onto the frame suction-holding section.

4. The cleaning device for the wafer-suction chuck mechanism according to claim 1, wherein the frame suction-holding section cleaning means comprises a spring mechanism that elastically absorbs a force for pressing the scraper or the brush against the frame suction-holding section.

5. The cleaning device for the wafer-suction chuck mechanism according to claim 1, further comprising a keep-wet nozzle that intermittently supplies water onto the frame suction-holding section.

* * * * *